Dec. 21, 1926.
A. PINCUS
1,611,777
GRATING APPARATUS
Filed May 20, 1925
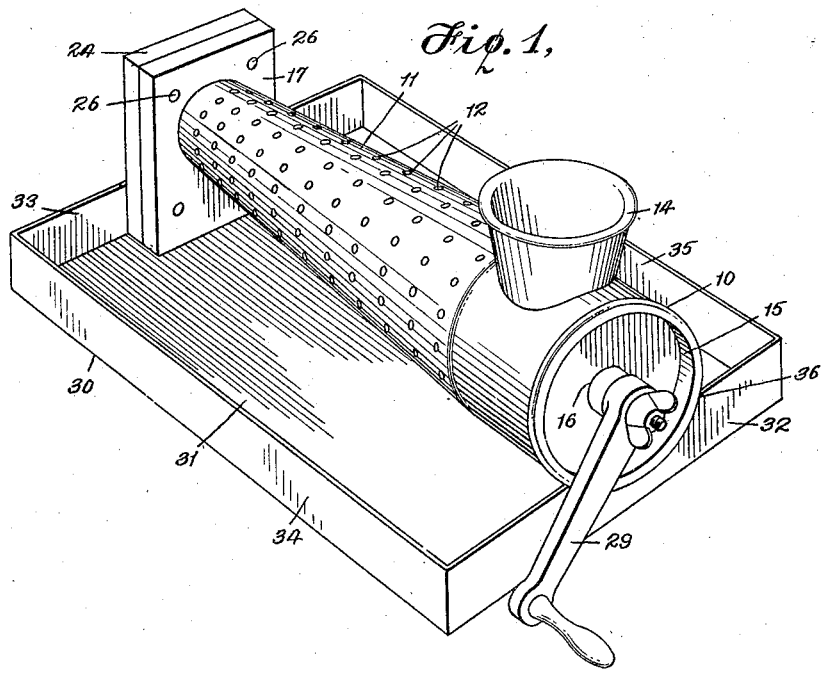
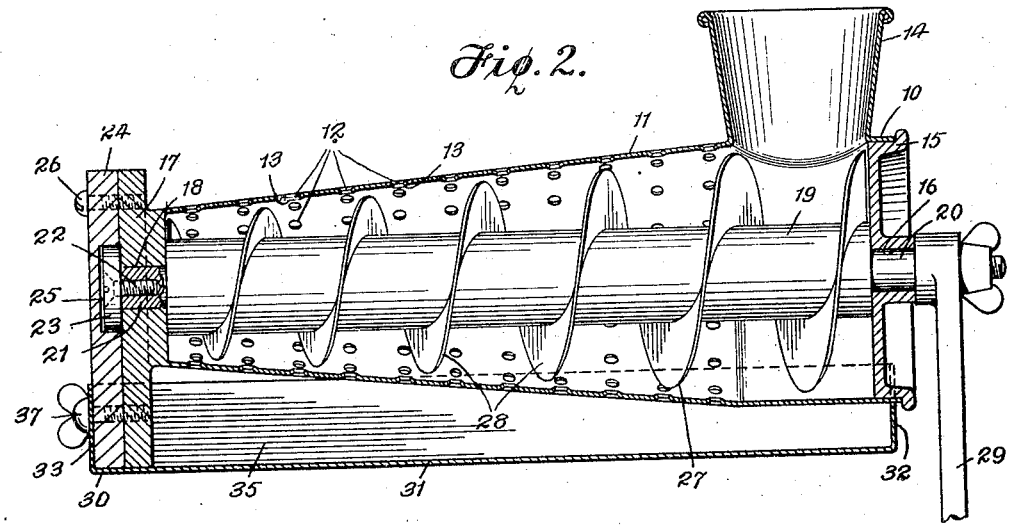
INVENTOR,
Abraham Pincus.
BY
W. T. Criswell
ATTORNEY Patented Dec. 21, 1926.

1,611,777

UNITED STATES PATENT OFFICE.

ABRAHAM PINCUS, OF BROOKLYN, NEW YORK.

GRATING APPARATUS.

Application filed May 20, 1925. Serial No. 31,532.

This invention relates more particularly to a class of apparatus for use in the preparation of classes of food products.

My invention has for its object primarily to provide an apparatus designed to be employed for grating or granulating potatoes, turnips, carrots, apples and other vegetables and fruit especially those of bulbular forms so that they may be prepared with facility in various ways in a raw state or for being cooked and which is of a form adapted to overcome the objections to the usual methods wherein the grating of these classes of food products is usually accomplished by hand with attendant danger of injury to the person doing the work. The invention contemplates mainly the provision of a stationary tapered cylinder having in its walls spaced orifices or outlets each with inwardly protruding cutting edges for grating vegetables and fruit and for discharge through the orifices of the grated particles of the products. In the cylinder is a rotary shaft having an encircling spiral blade for causing the vegetables or fruit admitted into the cylinder to be moved lengthwise of the cylinder into contact with the cutting edges of the orifices. The cylinder is of a length and the orifices in such numbers that the products will be grated substantially in entirety during their passage in the cylinder, and in turn the work of preparing the products will be greatly facilitated.

A further object of the invention is to provide a grating apparatus of a simple, efficient and durable construction which may be made in appropriate sizes and shapes.

With these and other objects in view, the invention will be hereinafter more fully explained with reference to the accompanying drawing forming a part of this specification in which similar characters of reference indicate corresponding parts in all the views, and will then be pointed out in the claim at the end of the description.

In the drawing, Figure 1 is a perspective view of one form of grating apparatus embodying my invention, and Fig. 2 is a sectional view, partly in detail and partly fragmentary, taken longitudinally through the apparatus.

The apparatus has a cylinder 10 which may be of any appropriate size for holding movably therein vegetables or fruit of mainly bulbular forms, such as potatoes, turnips, carrots, apples and like products, and the cylinder 10 has an annular metal wall 11 which is preferably tapered lengthwise. In spaced parts of the wall 11 of the cylinder throughout approximately its entire length are spaced orifices 12, each having its entire edge portion protruding or tapered inwardly of the cylinder, and the protruding edge of each orifice is sharpened, at 13. The orifices 12 provide outlets for discharge of the contents of the cylinder, and the sharpened edges 13 of the orifices provide cutters for grating vegetables and fruit. Extending upwardly from the large end of the wall of the cylinder may be a hopper 14 leading into the cylinder for serving as an inlet through which vegetables and fruit are admitted into the cylinder. The end of the cylinder is closed by a removable cover, as 15, having in its central portion a bore or bearing 16 which is alined with the center lengthwise of the cylinder. Closing the reduced end of the wall of the cylinder is a fixed plate 17 preferably of substantially a rectangular shape of a dimension considerably larger than the circumference of the wall 11 of the cylinder, and in this plate is a bore or bearing 18 which is in register with the bore 16 of the cover 15.

Within the cylinder 10 is a shaft 19 of a length so that it rotatively extends from the cover 15 to the fixed plate 17, and this shaft is preferably of larger diameter than the bore 16 of the cover and the bore 18 of the plate 17. Extending from one end of the shaft 19 is a stud 20 which is rotatably disposed through the bore 16 of the cover 15, and this stud is of such length that it protrudes beyond the cover. Projecting from the other end of the shaft 19 is another stud 21 which is rotatably disposed through the bore 18 of the fixed plate 17. Bolted, as at 22, or otherwise removably fastened on the free end of the stud 21 is a disk 23 of larger circumference than the diameter of the stud 21, and this disk rotatably contacts with the face of the plate 17 for holding the shaft 19 in the cylinder as well as for preventing tendency of the shaft to slidably move lengthwise of the cylinder. On the face of the plate 17 opposite to the cylinder 10 may be a second substantially rectangular plate 24 of a size similar to the plate 17, and in the plate 24 is a socket, as 25, in which the disk 23 of the shaft 19 is rotatably seated. The plates 17 and 24 are detachably fastened together by screws 26 or otherwise, and encircling the shaft is a spiral flat blade 27 which is rotatable with the rotation of the shaft. The spiral blade 27 is of such a length that its ends terminate in close proximity to the cover 15 and to the plate 17. The blade is of a shape so that the free edges of its convolutions 28 taper similar to the taper of the orificed wall 11 of the cylinder, and the blade is of such a varying width that the free edges of its convolutions will move in close proximity to the cutting edges 13 of the orifices or outlets 12 of the cylinder. On the protruding end of the stud 20 of the shaft 19 is a crank handle, as 29, for permitting the shaft 19 and the spiral blade 27 to be manually rotated, and under the cylinder 10 may be a tray, as 30, for receiving the grated vegetables or fruit discharged from the cylinder.

The tray 30 may be of any appropriate size and shape, though the form of the tray illustrated is approximately rectangular to provide a bottom 31, front wall 32, rear wall 33 and side walls 34, 35. In the central part of the upper edge of the front wall 32 may be a partially circular notch, as 36. The tray is of a length so that the front portion of the cylinder 10 is disposed in the notch 36 and so that the plate 24 abuts against the inner face of the rear wall 33 with the lower edges of both of the plates 17 and 24 resting on the bottom 31 of the tray. The tray is preferably of a width that its side walls 34, 35 are considerably spaced from the cylinder 10, and the cylinder is removably fastened to the tray by one or more screws and wing nuts, as 37, being threaded through registered holes in the plates 17 and 24 of the cylinder and in the rear wall 33 of the tray.

When the apparatus is operated for grating vegetables, fruit and the like, one or a number of the food products are inserted into the cylinder through the hopper or inlet 14 and the products will pass between the convolutions 28 at the forward end of the blade 27. By then turning the handle 29 from left to right the shaft 19 and the blade will be rotated, and the product will be revolvably moved by the convolutions of the blade into contact with the cutting edges 13 of the orifices or outlets of the wall 11 of the cylinder. The product will thereby be gradually grated during its passage toward the reduced end of the cylinder for being practically grated in entirety by properly proportioning the cylinder 10, the shaft 19 and the spiral blade 27. During the grating process the particles of the product will be discharged through the outlets 12 of the cylinder into the receiving tray 30.

When it is desired to clean the interior of the cylinder 10, the shaft 19 and the guide blade 27, may be removed from the tray 30 by unscrewing the nuts and bolts 37, and the plates 17, 24 with the cylinder and other parts may be separated from the tray. By loosening the bolts 26 the plate 24 may be separated from the plate 17, and by loosening the bolt 22 the disk 23 may be separated from the stud 21 of the shaft 19. The crank handle 29, cover 15 and the shaft 19 with the blade 27 may be removed from the cylinder 10 for being cleaned, and these parts of the apparatus may be reassembled by subsequently fastening them together.

In the foregoing description, I have embodied the preferred form of my invention, but I do not wish to be understood as limiting myself thereto, as I am aware that modifications may be made therein without departing from the spirit or sacrificing any of the advantages of this invention, therefore, I reserve to myself the right to make such changes as fairly fall within the scope thereof.

Having thus described my invention, I claim as new and desire to secure by Letters Patent:—

A grating apparatus comprising an abutment having a recess therein, a tapered perforated cylinder having its smaller end secured to the abutment, a head having a central aperture closing the larger end of the cylinder, a removable shaft carrying a spiral journaled in the head and in the abutment, and means for feeding material to the interior of the cylinder.

This specification signed this 19th day of May, A. D. 1925.

ABRAHAM PINCUS.